US012288391B2

(12) United States Patent
Chen et al.

(10) Patent No.: US 12,288,391 B2
(45) Date of Patent: Apr. 29, 2025

(54) IMAGE GROUNDING WITH MODULARIZED GRAPH ATTENTIVE NETWORKS

(71) Applicant: International Business Machines Corporation, Armonk, NY (US)

(72) Inventors: Zhenfang Chen, Cambridge, MA (US); Chuang Gan, Cambridge, MA (US); Bo Wu, Cambridge, MA (US); Pin-Yu Chen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 17/743,661

(22) Filed: May 13, 2022

(65) Prior Publication Data

US 2023/0368510 A1 Nov. 16, 2023

(51) Int. Cl.
*G06V 30/262* (2022.01)
*G06V 10/422* (2022.01)
*G06V 10/82* (2022.01)

(52) U.S. Cl.
CPC ............ *G06V 10/82* (2022.01); *G06V 10/422* (2022.01); *G06V 30/262* (2022.01)

(58) Field of Classification Search
None
See application file for complete search history.

(56) References Cited

U.S. PATENT DOCUMENTS

2021/0224601 A1* 7/2021 Chen ..................... G06N 3/08
2021/0248376 A1* 8/2021 Zhao ..................... G06V 20/49

FOREIGN PATENT DOCUMENTS

CN          110110043 A      8/2019

OTHER PUBLICATIONS

Antol et al., "VQA: Visual Question Answering", arXiv:1505.00468v7 [cs.CL] Oct. 27, 2016, 25 pages, doi.org/10.48550/arXiv.1505.00468.
He et al., "Mask R-CNN", arxiv.org, Computer Vision and Pattern Recognition (cs.CV), submitted on Mar. 20, 2017 (v1), last revised Jan. 24, 2018 (v3), retrieved from the Internet < Mar. 10, 2022 at 1:23 PM EST>, arXiv:1703.06870v3 [cs.CV] Jan. 24, 2018, 12 pages.
Lee et al., "Stacked Cross Attention for Image-Text Matching", Proceedings of the European Conference on Computer Vision (ECCV), 2018, pp. 201-216, Abstract only, 1 page.
Liu et al., "Improving Referring Expression Grounding with Cross-modal Attention-guided Erasing", arXiv:1903.00839v2 [cs.CV] Apr. 2, 2019, 10 pages, doi.org/10.48550/arXiv.1903.00839.

(Continued)

Primary Examiner — Idowu O Osifade
(74) Attorney, Agent, or Firm — Michael O'Keefe

(57) ABSTRACT

A system may include a memory and a processor in communication with the memory. The processor may be configured to perform operations. The operations may include receiving an input, extracting features from the input, and mining object relations using the features. The operations may include determining feature vectors using the object relations and generating, using the feature vectors, an output indicating a target region, wherein the target region corresponds to the input.

17 Claims, 11 Drawing Sheets

(56) References Cited

OTHER PUBLICATIONS

Mell et al., "The NIST Definition of Cloud Computing", Recommendations of the National Institute of Standards and Technology, NIST Special Publication 800-145, Sep. 2011, 7 pages.
Pal et al., "Image Retrieval: A Literature Review", International Journal of Advanced Research in Computer Engineering and Technology (IJARCET), vol. 2, Issue 6, Jun. 2013, doi.org/10.13140/2.1.1051.4565, 5 pages.
Qi et al., "REVERIE: Remote Embodied Visual Referring Expression in Real Indoor Environments", arXiv:1904.10151v2 [cs.CV] Jan. 6, 2020, 16 pages, doi.org/10.48550/arXiv.1904.10151.
Rohrbach et al., "Grounding of Textual Phrases in Images by Reconstruction", 18 pages, arXiv:1511.03745v4 [cs.CV] Feb. 17, 2017.
Shrestha et al., "MAGNet: Multi-Region Attention-Assisted Grounding of Natural Language Queries at Phrase Level", arXiv:2006.03776v1 [cs.CV] Jun. 6, 2020, 13 pages, doi.org/10.48550/arXiv.2006.03776.
Yu et al., "MAttNet: Modular Attention Network for Referring Expression Comprehension", arXiv:1801.08186v3 [cs.CV] Mar. 27, 2018, doi.org/10.48550/arXiv.1801.08186, 15 pages.
Yu et al., "Modeling Context in Referring Expressions", arXiv:1608.00272v3 [cs.CV] Aug. 10, 2016, doi.org/10.48550/arXiv.1608.00272, 19 pages.

\* cited by examiner

IMAGE GROUNDING WITH MODULARIZED GRAPH ATTENTIVE NETWORKS

BACKGROUND

The present disclosure relates to matching textual expressions to visual properties and, more specifically, to image grounding.

Image grounding may be used in applications such as visual question answering (e.g., enabling or assisting computers to reply to questions regarding images), text-based image retrieval (e.g., retrieving images from a gallery related to a query text), robotic navigation (e.g., using text instructions in room navigation), and similar applications. Models may be used to identify objects or object regions in images with visual properties described by or sharing similarities with one or more text expressions.

SUMMARY

Embodiments of the present disclosure include a system, method, and computer program product for precise image grounding using modularized graph attentive neural networks. A system in accordance with the present disclosure may include a memory and a processor in communication with the memory. The processor may be configured to perform operations. The operations may include receiving an input, extracting features from the input, and mining object relations using the features. The operations may include determining feature vectors using the object relations and generating, using the feature vectors, an output indicating a target region, wherein the target region corresponds to the input.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
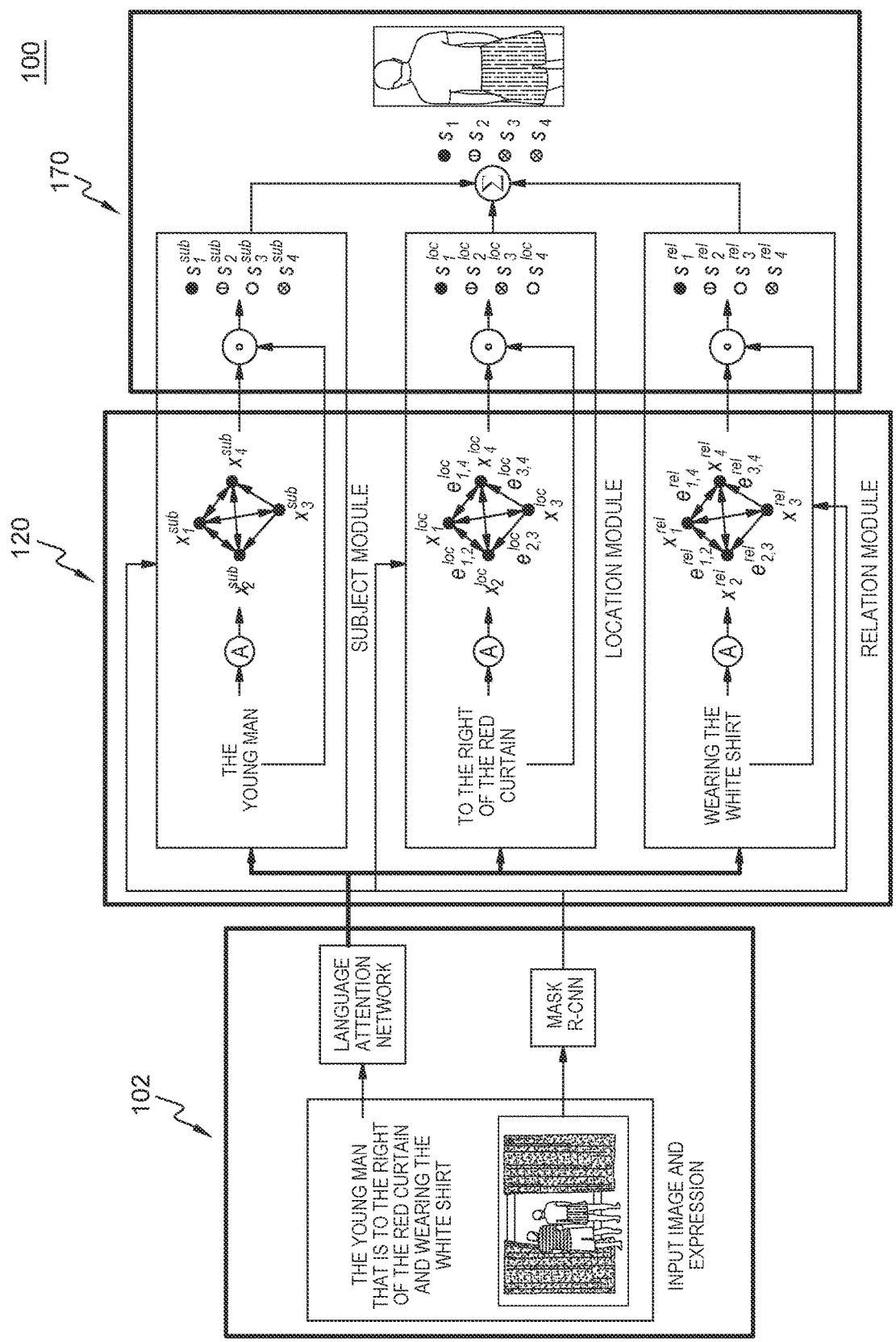
FIG. 1 illustrates a system for image grounding in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to matching textual expressions to visual properties and, more specifically, to image grounding. Image grounding may be used in various applications. Inquiries which may utilize image grounding to obtain a result may use one or more complex text expressions to identify an object region in a visual expression (e.g., a picture, image, graph, chart, or similar). Some aspects of the present disclosure may enable precise image grounding, e.g., precisely identifying an object region described by a complex text expression from a set of images with similar properties.

For example, an inquiry may be phrased as a request to identify "the red apple in the middle of the wooden bowl" and the picture containing it. In accordance with the present disclosure, precise image grounding may be used to differentiate the best answer from distractor options. Distractor options may include, for example, dissimilar distractor options (e.g., images that do not contain any apples or bowls), distractor options that satisfy one aspect of the inquiry (e.g., an image with a green apple or a ceramic bowl), distractor options that satisfy a specific aspect of the inquiry (e.g., an image with a red apple but no bowl, or an image with a wooden bowl but no apples), and distractor options that include multiple but not all aspects of the inquiry (e.g., an image with both apples and bowls but the apples are not in the bowl). Some embodiments of the present disclosure may respond to an inquiry (e.g., generate a proper response output) by localizing a target region that satisfies the inquiry.

In some aspects of the present disclosure, fine-grained object relations and subtle visual differences may be used by a model to respond to an inquiry. Some aspects of the present disclosure may utilize natural language processing (NLP) or similar techniques to parse text expressions that may be short and simple or long and complex.

Some aspects of the present disclosure may combine a modularized network with a graph neural network to generate a modularized graph attentive neural network (MGANN). In some embodiments of the present disclosure, the MGANN may be used in various applications such as, for example, precise image grounding.

An MGANN may improve the image grounding ability of a model. In some embodiments, such an improvement may enable a model to distinguish between subtle visual difference in images. An MGANN may be used to understand long and complicated textual compositions and text expressions.

In some embodiments of the present disclosure, an MGANN may receive one or more inputs including a query; the MGANN may generate an output that specifies an answer to the query. For example, an input may include a query text expression and a set of images; the images may be submitted to the MGANN one at a time. The MGANN may digest the input, identify an answer to the query, and output a target region from the set of images that satisfies the description of the query text expression.

In some embodiments of the present disclosure, the input to the MGANN model may include a query text expression and a set of similar images. The MGANN may match each image with the query expression one at a time. The MGANN may then output a visual region that fully matches the query text expression.

In some embodiments of the present disclosure, the MGANN may decompose a query text into different textual modules with attention; for example, the MGANN may use an NLP attention neural network or similar language attention network to decompose the query into textual modules. The textual modules may include, for example, a subject module, a location module, a relation module, an objective module, an action module, and the like.

Each of the textual modules may use a language-guided (e.g., text-guided) graph neural network (GNN) to mine fine-grained object relations and subtle visual differences. The textual modules may aggregate the different matching similarities to determine the region that best matches the query. The MGANN may output the region that best matches the query to a user and identify it as the target region (e.g., as a cropped image or as a whole image with an indicator box around the target region) that satisfies the description of the query text expression. In some embodiments, the target region may be from a set of images submitted to the MGANN as an input.

In some embodiments of the present disclosure, a bidirectional long short-term memory (Bi-LSTM) may be used to encode a word sequence and an attention network may be used to extract textual features for the modules (e.g., subject, location, relation, objective, and/or action modules). A pre-trained image object detection mechanism (e.g., an algorithm or deep learning method) may be used to detect region proposals and extract visual regional features. A pre-trained image object detection mechanism may be, for example, a convolutional neural network model such as a mask output region-based convolutional neural network (mask R-CNN). In accordance with the present disclosure, an MGANN may include a Bi-LSTM, an attention network, and a mask R-CNN; the MGANN may use the Bi-LSTM to encode a sequence, the attention network to extract textual features, and the mask R-CNN to detect region proposals and extract visual regional features.

In some embodiments of the present disclosure, an attention network may extract textual features for each module. For example, a query may request, "The young man to the right of the red curtain and wearing a white shirt;" the attention network may parse a subject component "The young man" for a subject module, a location component "to the right of the red curtain" for a location module, and a relation component "wearing a white shirt" for the relation module.

In some embodiments of the present disclosure, text-guided visual message passing may be used. For example, a text-guided graph attentive network may be used to aggregate the visual features of each region. A text-guided graph attentive network may be applied to each module of the query text expression independently; for example, if there is a subject module, a location module, and a relation module, a graph attentive network may be applied to each module independently of the other modules. In some embodiments, the same neural network may be applied to each module separately; in some embodiments, the graph attentive neural networks may be distinct used only for its specific module.

An attention module may be used to obtain the relations of each visual node and their neighborhood nodes conditional on the text description. Each visual node may be aggregated to form context information based on the visual node and its neighboring nodes. A text-guided GNN may be used to perform message passing to obtain more visual feature data for each region; in some embodiments, a multi-layer text-guided GNN may be used.

The weighted sum features of attention weights for different modules can be determined using:

$$t^{mdl} = a_t^{mdl} w_n$$  Equation 1:

wherein t is the feature vector of the modularized text embeddings, a is attention, $w_t$ is an embedding variable for word number n in the expression sequence (e.g., t=3 for the third word in a textual query), mdl includes the elements from all of the modules used by the system.

In some embodiments of the present disclosure, correlations between regions in images may be used. An equation to obtain the correlation between the ith region and the jth region of the module may be expressed as:

$$A_{i,j}^{\overline{a,mdl}} = W_3(\tanh(W_1 t^{mdl} + W_2 x_{ij}^{mdl}))$$  Equation 2:

wherein a denotes attention, mdl refers to the module the correlation is being obtained for, $A_{i,j}^{\overline{a,mdl}}$ is the correlation between the ith region and the jth region of the module mdl, W is a weight matrix for mapping the feature vector into a scalar, tanh is an activation function, t is the feature vector of the modularized text embeddings, and x is the feature vector of a node in a graph. In some embodiments of the present disclosure, the graph may be or overlay an image, x may be the feature vector of a node on the image, and thus x may refer to a region in the image.

The correlation output $A_{i,j}^{\overline{a,mdl}}$ may be normalized:

$$A_{i,j}^{a,mdl} = \text{softmax}(A_{i,j}^{\overline{a,mdl}})$$  Equation 3:

wherein $A_{i,j}^{a,mdl}$ is the normalized correlation between the ith region and the jth region of the module mdl and softmax is an activation function of the neural network to normalize the output of the network to a probability distribution over predicted output classes based on Luce's choice axiom.

The normalized correlation $A_{i,j}^{a,mdl}$ may be used to identify a feature vector of a node in a graph:

$$x_i^{a,mdl} = \Sigma_j A_{i,j}^{a,mdl} x_j^{mdl}$$  Equation 4:

wherein x is the feature vector of a node in a graph.

For example, if the attention network extracts the textual features into three modules including a subject module, a location module, and a relation module, then mdl∈{sub, loc, rel} wherein sub denotes the subject textual features, loc denotes the location textual features, and rel denotes the relation textual features. In another example, if the attention network extracts the textual features into five modules including a subject module, a location module, a relation module, an objective module, and an action module, then mdl∈{sub, loc,rel,obj,act} wherein sub denotes the subject textual features, loc denotes the location textual features, rel denotes the relation textual features, obj denotes the objective textual features and act denotes the action textual features.

In some embodiments of the present disclosure, the mask R-CNN may be used to derive features from an image. For example, spatial coordinates of a region may be derived for a subject module, coordinate differences between a target object and other objects of the same or similar categories may be derived for a location module, and coordinate differences between the target object and other objects of different categories may be derived for a relation module. In some embodiments, one mask R-CNN may be used to derive features for more than one (e.g., two, three, or all) of the modules; in some embodiments, each module may have a distinct mask R-CNN to derive features for it.

In some embodiments of the present disclosure, different kinds of features may be extracted for different modules. One or more attention weighted sums may be used to aggregate a feature vector for each module; in some embodiments, the aggregation of the feature vector for one or more modules may be executed automatically.

In some embodiments of the present disclosure, the mask R-CNN may derive visual features of the target (e.g., an object requested in a query) and the spatial coordinates of the region of the target for the subject module. In some embodiments, the mask R-CNN may derive features of the target object and the spatial coordinate differences between the target object and other objects in the same or similar categories for the location module. In some embodiments, the mask R-CNN may derive features of the target object and the spatial coordinate differences between the target object and other objects in different categories for the location module.

Class predictions from the mask R-CNN may be used for assigning features to modules. Different modules may focus on different components of matching between query expressions and target visual regions. In some embodiments of the present disclosure, such dedicated focus of each module may contribute to improved precision of image grounding.

In some embodiments of the present disclosure, modularized similarity may be used for precise image grounding. Modularized similarity may be determined by matching modularized textual features with visual features.

In some embodiments, modularized similarity between textual features and visual features may be done using bilinear matching. The modularized textual features and visual features may be mapped using fully connected layers. The dot products between the textual features and the visual features may be calculated to obtain the modularized similarities. A modularized similarity may be calculated by:

$$s_i^{mdl} = \tanh(W_n^{mdl} t^{mdl}) \tanh(W_x^{mdl} x_i^{mdl}) \quad \text{Equation 5:}$$

wherein $s^{mdl}$ is the similarity for module mdl.

The similarities may be linearly aggregated over the modules to get a final similarity. The final similarity between each visual region and the query text expressions may be obtained by aggregating the similarities of different modules. Similarities may be linearly aggregated over different modules to obtain the final similarity. The final similarity for a system using a subject module, a location module, and a relation module may be calculated using:

$$s_i = \sum_{mdl \in \{sub, loc, rel\}} \lambda^{mdl} s_i^{mdl} \quad \text{Equation 6:}$$

wherein s is the final similarity and $\lambda$ is a scalar weighting the importance of the modularized similarity $s^{mdl}$.

In accordance with some embodiments of the present disclosure, an MGANN may be used to achieve precise image grounding in various settings; in particular, situations calling for image grounding with fine-grained images, similar images, and with a target object in the same or similar category as other objects in the images. In some embodiments, an MGANN system may be effective for distinguishing subtle visual differences and modeling fine-grained object relations.

A method in accordance with the present disclosure may include receiving a textual statement and a plurality of images; the textual statement may include a plurality of textual modules. The method may include extracting textual features in the images based on the textual modules; the textual features may include a subject module, a location module, and a relation module. The method may include determining, for each of the images, relations of visual nodes with neighboring visual nodes conditional on the textual features. The method may include determining, for each of the images, aggregate context information of the visual nodes from the respective neighboring visual nodes. The method may include determining feature vectors for the subject module, the location module, and the relation module based on the relations and aggregate context information. The method may include generating an output indicating a target region in a select one of the images that corresponds to the textual statement based on the feature vectors.

A system in accordance with the present disclosure may include a memory and a processor in communication with the memory. The processor may be configured to perform operations. The operations may include receiving an input, extracting features from the input, and mining object relations using the features. The operations may include determining feature vectors using the object relations and generating, using the feature vectors, an output indicating a target region, wherein the target region corresponds to the input.

In some embodiments of the present disclosure, the input may include a textual statement including a plurality of textual modules.

In some embodiments of the present disclosure, the input may include a plurality of images. In some embodiments, the operations may include selecting the target region as a component of one of the plurality of images.

In some embodiments of the present disclosure, the extracting may be based on at least one module. In some embodiments, the at least one module may include a subject module, a location module, and a relation module.

In some embodiments of the present disclosure, the operations may include determining relations of visual nodes with neighboring visual nodes. In some embodiments, the determining may be conditional on textual features of the input. In some embodiments, the operations may include aggregating context information of visual nodes from neighboring visual nodes. In some embodiments, the operations may further include using the context information to determine the feature vectors.

In some embodiments of the present disclosure, the operations may include encoding a textual sequence from the input. In some embodiments, the textual sequence may be encoded using a bidirectional long short-term memory neural network.

In some embodiments of the present disclosure, the operations may include extracting textual features using an attention network. In some embodiments, the textual features may be extracted for a subject module, a location module, and a relation module. In some embodiments, the operations may further include applying a text-guided graph attentive network to the textual features of the subject module, the location module, and the relation module.

In some embodiments of the present disclosure, the operations may include detecting regional proposals. In some embodiments, the operations may include using a mask region-based convolutional neural network.

In some embodiments of the present disclosure, the operations may include extracting visual regional features. In some embodiments, the operations may include using a mask region-based convolutional neural network to extract the visual regional features.

In some embodiments of the present disclosure, the operations may include applying a text-guided graph attentive network to a module of the input.

In some embodiments of the present disclosure, an attention module may be used in the mining the object relations. In some embodiments, the attention module may mine the object relations conditional on at least one textual feature.

In some embodiments of the present disclosure, the operations may include determining visual regional node aggregate context information based on neighborhood nodes.

In some embodiments of the present disclosure, the operations may include obtaining comprehensive visual features for a plurality of regions in the input by performing message passing. In some embodiments, a text-guided graph neural network is used to perform message passing.

In some embodiments of the present disclosure, the operations may include matching, bilinearly, modularized similarity between modularized textual features of the input and modularized visual features of the input.

In some embodiments of the present disclosure, the operations may include aggregating, linearly, similarities over a plurality of modules to obtain a final similarity, wherein the final similarity is used in generating the output.

FIG. 1 illustrates a system 100 for image grounding in accordance with some embodiments of the present disclosure. The system 100 includes a query component 102, a mining component 120, and an aggregation component 170.

The query component 102 may decompose a query text into one or more textual modules. For example, the query component 102 may parse the query text into a subject module, a location module, and a relation module; in some embodiments, additional or alternative modules may be used. In some embodiments, the query component 102 may separate the query text using attention via, e.g., an attention module using an attention neural network.

In some embodiments, one or more Bi-LSTMs may be used to encode the query. An attention network (e.g., an attention neural network) may be used to extract textual features for the various modules; for example, textual features may be extracted for a subject module, a location module, a relation module, an objective module, and/or an action module. Regional proposals may be detected using a pre-trained mask R-CNN. Visual regional features may be extracted using a pre-trained mask R-CNN. In some embodiments, the mask R-CNN that detects the regional proposals may be the same mask R-CNN that extracts the visual regional features.

The mining component 120 may mine data from the input (e.g., from one or more images). For example, the mining component 120 may mine fine-grained object relations (e.g., the location of one object relative to another object) and subtle visual differences. In some embodiments, a language-guided GNN (e.g., a text-guided GNN for a textual query or a verbal-guided GNN for a spoken query) may be used to mine the data.

In some embodiments of the present disclosure, the language-guided graph network may have a certain number of layers. In some embodiments, a user may alter the number of layers used in the language-guided graph network; for example, the number of layers in the network may be increased for improved graph relations and precision. In some embodiments, a user may alter the number of layers used in the language-guided graph network independently for each module; for example, a user may increase the number of layers for the location module and decrease the number of layers for the subject module, e.g., to compensate for the additional computational load the location module may require.

The aggregation component 170 may aggregate the similarities across the modules to ascertain the region that best matches the query. The aggregation component 170 may aggregate different matching similarities. In some embodiments, the aggregation component 170 may be used to match differences between a query and potential results.

The aggregation component 170 may use a language-guided (e.g., a text-guided) graph attentive network to aggregate the visual features of each region. Equations 1-4 may be used to obtain the regional similarities A, feature vectors of nodes x, and the weighted sum features of attention weights for each of the modules:

$$t^{mdl} = a_t^{mdl} w_n \qquad \text{Equation 1:}$$

$$\widetilde{A_{i,j}^{a,mdl}} = W_3(\tanh(W_1 t^{mdl} + W_2 x_{i,j}^{mdl})) \qquad \text{Equation 2:}$$

$$A_{i,j}^{a,mdl} = \text{softmax}(\widetilde{A_{i,j}^{a,mdl}}) \qquad \text{Equation 3:}$$

$$x_i^{a,mdl} = \sum_j A_{i,j}^{a,mdl} x_j^{mdl} \qquad \text{Equation 4:}$$

An attention module (e.g., an attention neural network) may be used to obtain the relations of each visual node and neighboring nodes conditional on the text descriptions. Each visual regional node may have context information that may be obtained from neighborhood nodes and/or that may be obtained from the relationship of the node with the neighborhood nodes. A language-guided GNN may be used to perform message passing to obtain visual features for each region. The language-guided GNN may have multiple layers; some embodiments of the present disclosure may use a GNN that has more or fewer layers than a GNN used in some other embodiment of the present disclosure.

Figure 2:
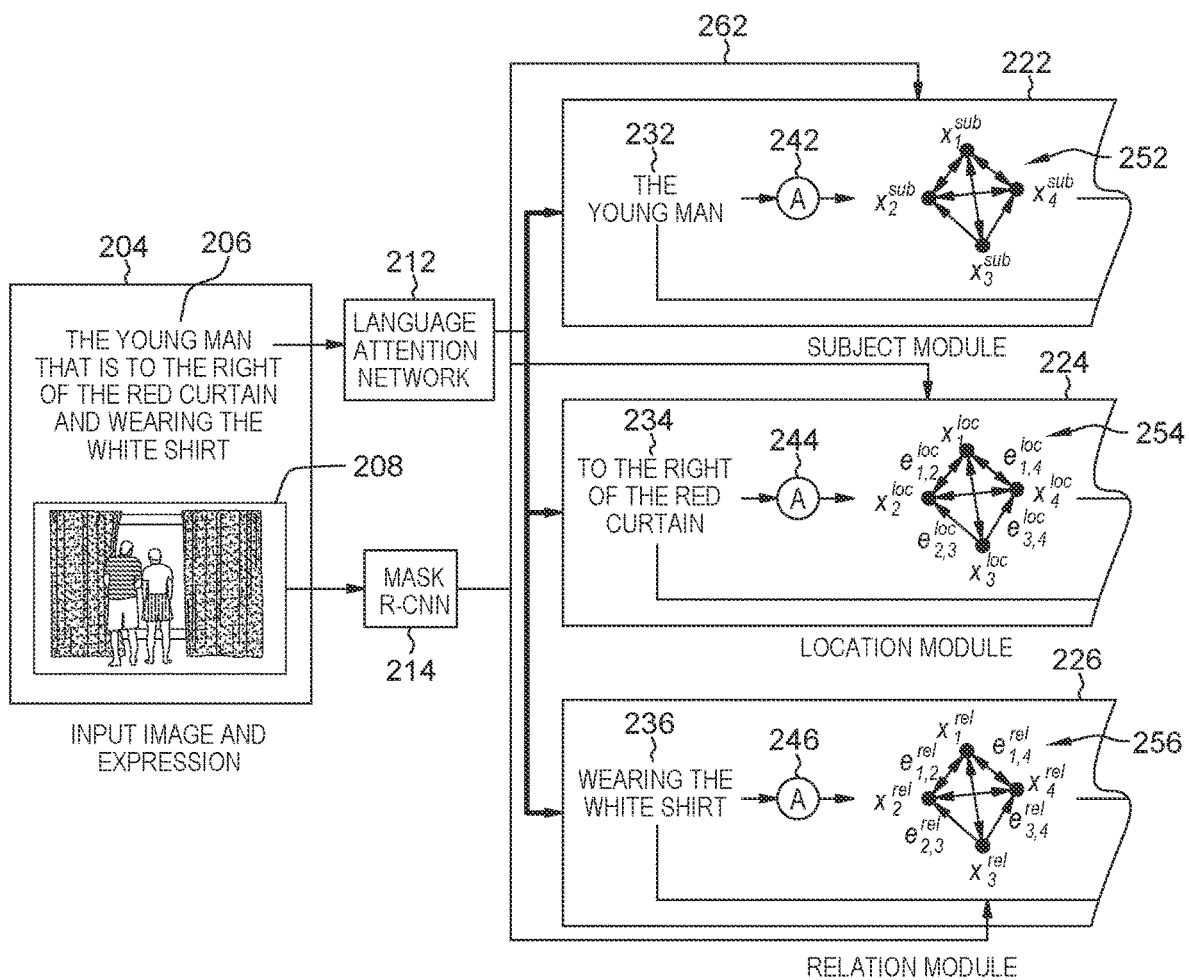
FIG. 2 depicts a system for image grounding in accordance with some embodiments of the present disclosure.

FIG. 2 depicts a system 200 for in image grounding in accordance with some embodiments of the present disclosure. The system 200 includes an input 204, a language attention network 212, a mask R-CNN 214, and three modules.

The input 204 includes a text query 206 and an image input 208; in some embodiments, more than one text input and/or input image 208 may be submitted to the system 200. The text query 206 is submitted to the language attention network 212. The language attention network 212 may separate the text query 206 into components for the modules. For example, the text query 206 may be separated into a first component for a subject module 222, a second component for the location module 224, and a third component for a relation module 226. In some embodiments, additional or alternative modules may be used, and the language attention network 212 may separate the text query 206 into components for additional or alternative modules.

The input image 208 is submitted to the mask R-CNN 214. The mask R-CNN 214 may detect region proposals and/or extract visual regional features. The mask R-CNN 214 may detect spatial coordinates of one or more regions in the input image 208 for the subject module 222. The mask R-CNN 214 may detect coordinate differences between a query target and similar or the same objects (e.g., objects in the same or similar categories) in the image input 208; these may be submitted to the location module 224. The mask R-CNN 214 may detect coordinate differences between a query target and objects of different categories in the input image 208; these may be submitted to the relation module 226.

The modules include a subject module 222, a location module 224, and a relation module 226. The modules each receive a language input via the language attention network 212. The modules each receive an image input 262 via the mask R-CNN 214.

The subject module 222 receives a subject language input 232; the subject language input 232 is related to the subject of the query as identified by the language attention network 212. The subject module 222 may use an attention neural network 242 to modularize the subject language input 232 and render a graphical representation 252 of the subject language input 232.

The location module 224 receives a location language input 234; the location language input 234 is related to the location of the query as identified by the language attention network 212. The location module 224 may use an attention neural network 244 to modularize the location language input 234 and render a graphical representation 254 of the location language input 234.

The relation module 226 receives a relation language input 236; the relation language input 236 is related to the relation of the query as identified by the language attention network 212. The relation module 226 may use an attention neural network 246 to modularize the relation language input 236 and render a graphical representation 256 of the relation language input 236.

Figure 3:
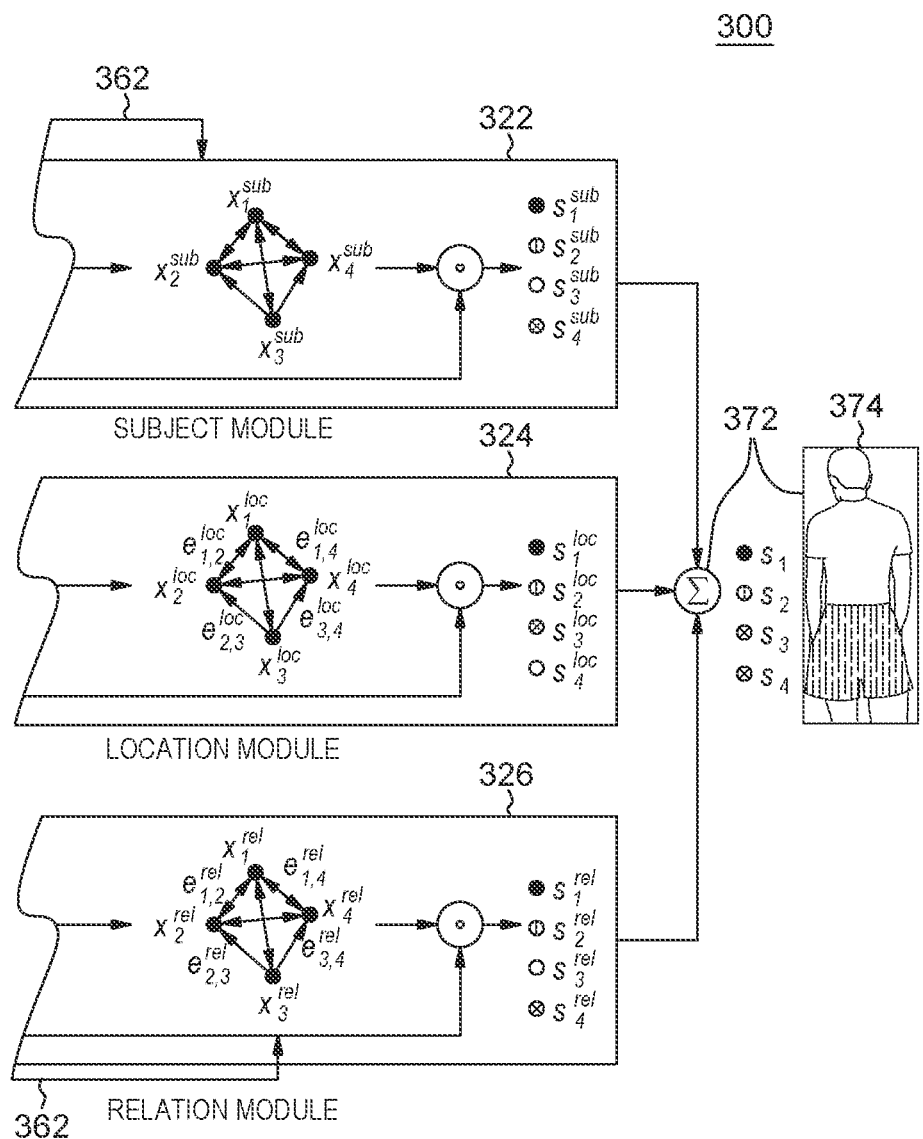
FIG. 3 illustrates a system for image grounding in accordance with some embodiments of the present disclosure.

FIG. 3 illustrates a system 300 for image grounding in accordance with some embodiments of the present disclosure. The system 300 uses modules to generate modularized similarities; the modularized similarities may be aggregated to render a final similarity 372 to achieve an output 374. In some embodiments of the present disclosure, the final similarity 372 may also be the output 374; in some embodiments, the final similarity 372 may be used to generate the output 374.

A subject module 322 may be used to generate one or more subject similarity values; these subject similarity values are modularized similarity values for the subject module. The modularized similarity may be determined by matching modularized textual features (e.g., from the subject language input 232 identified by the language attention network 212 as shown in FIG. 2) to modularized visual features from an image input 362. The one or more subject similarity values may be aggregated to return a subject similarity.

A location module 324 may be used to generate one or more location similarity values; these location similarity values are modularized similarity values for the location module. The modularized similarity may be determined by matching modularized textual features (e.g., from the location language input 234 identified by the language attention network 212 as shown in FIG. 2) to modularized visual features from an image input 362. The one or more location similarity values may be aggregated to return a location similarity.

A relation module 326 may be used to generate one or more relation similarity values; these relation similarity values are modularized similarity values for the relation module. The modularized similarity may be determined by matching modularized textual features (e.g., from the relation language input 236 identified by the language attention network 212 as shown in FIG. 2) to modularized visual features from an image input 362. The one or more relation similarity values may be aggregated to return a relation similarity.

Each modularized similarity (e.g., subject similarity, location similarity, and relation similarity) may be calculated using Equation 5 linearly aggregated to obtain a final similarity 372 using Equation 6:

$$s_i^{mdl} = \tanh(W_n^{mdl} t_i^{mdl}) \tanh(W_x^{mdl} x_i^{mdl}) \qquad \text{Equation 5:}$$

$$s_i = \Sigma_{mdl \in \{sub, loc, rel\}} \lambda^{mdl} s_i^{mdl} \qquad \text{Equation 6:}$$

The final similarity 372 may itself be an output 374 or, alternatively, the final similarity may enable the return of an output 374 which may be generated for a user.

Figure 4:
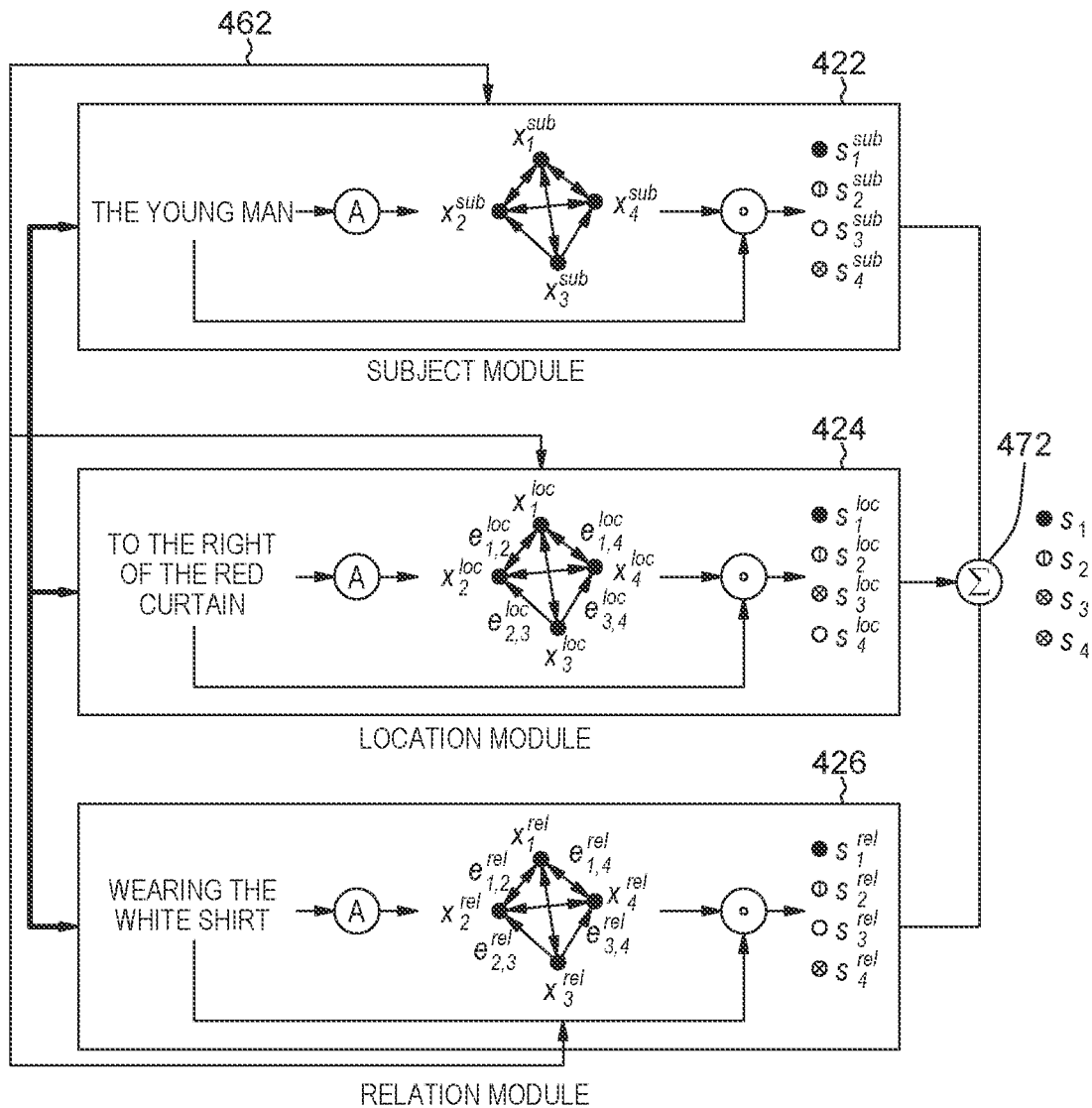
FIG. 4 depicts a graph neural network system for image grounding in accordance with some embodiments of the present disclosure.

FIG. 4 depicts a graph neural network system 400 for image grounding in accordance with some embodiments of the present disclosure. The graph neural network system 400 includes a query input and an image input 462. The inputs are delivered to a subject module 422, a location module 424, and a relation module 426. In some embodiments of the present disclosure, additional or alternative modules may be used; for example, an objective module and an action module may be added to the graph neural network system 400 for a five module system. The modules each return a modular similarity; the modular similarities may be aggregated into a final similarity 472.

A method in accordance with the present disclosure may include receiving an input, extracting features from the input, and mining object relations using the features. The method may include determining feature vectors using the object relations and generating, using the feature vectors, an output indicating a target region, wherein the target region corresponds to the input.

In some embodiments of the present disclosure, the input may include a textual statement including a plurality of textual modules.

In some embodiments of the present disclosure, the input may include a plurality of images. In some embodiments, the method may include selecting the target region as a component of one of the plurality of images.

In some embodiments of the present disclosure, the extracting may be based on at least one module. In some embodiments, the at least one module may include a subject module, a location module, and a relation module.

In some embodiments of the present disclosure, the method may include determining relations of visual nodes with neighboring visual nodes. In some embodiments, the determining may be conditional on textual features of the input. In some embodiments, the method may include aggregating context information of visual nodes from neighboring visual nodes. In some embodiments, the method may further include using the context information to determine the feature vectors.

In some embodiments of the present disclosure, the method may include encoding a textual sequence from the input. In some embodiments, the textual sequence may be encoded using a bidirectional long short-term memory neural network.

In some embodiments of the present disclosure, the method may include extracting textual features using an attention network. In some embodiments, the textual features may be extracted for a subject module, a location module, and a relation module. In some embodiments, the method may further include applying a text-guided graph attentive network to the textual features of the subject module, the location module, and the relation module.

In some embodiments of the present disclosure, the method may include detecting regional proposals. In some embodiments, the method may include using a mask region-based convolutional neural network.

In some embodiments of the present disclosure, the method may include extracting visual regional features. In some embodiments, the method may include using a mask region-based convolutional neural network to extract the visual regional features.

In some embodiments of the present disclosure, the method may include applying a text-guided graph attentive network to a module of the input.

In some embodiments of the present disclosure, an attention module may be used in the mining the object relations. In some embodiments, the attention module may mine the object relations conditional on at least one textual feature.

In some embodiments of the present disclosure, the method may include determining visual regional node aggregate context information based on neighborhood nodes.

In some embodiments of the present disclosure, the method may include obtaining comprehensive visual features for a plurality of regions in the input by performing message passing. In some embodiments, a text-guided graph neural network is used to perform message passing.

In some embodiments of the present disclosure, the method may include matching, bilinearly, modularized similarity between modularized textual features of the input and modularized visual features of the input.

In some embodiments of the present disclosure, the method may include aggregating, linearly, similarities over a plurality of modules to obtain a final similarity, wherein the final similarity is used in generating the output.

Figure 5:
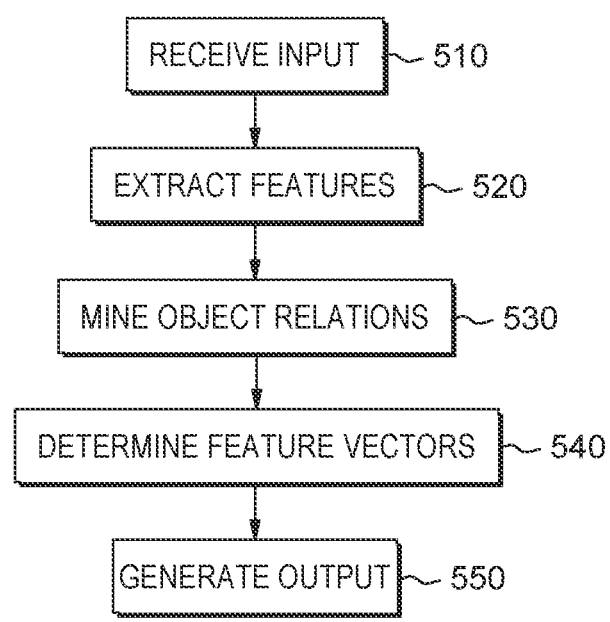
FIG. 5 illustrates method for image grounding in accordance with some embodiments of the present disclosure.

FIG. 5 illustrates method 500 for image grounding in accordance with some embodiments of the present disclosure. The method 500 may be implemented using a system for precise image grounding (e.g., system 100 of FIG. 1). The method 500 includes receiving 510 an input, extracting 520 features, and mining 530 object relations. The method 500 includes determining 540 feature vectors and generating 550 an output.

Figure 6:
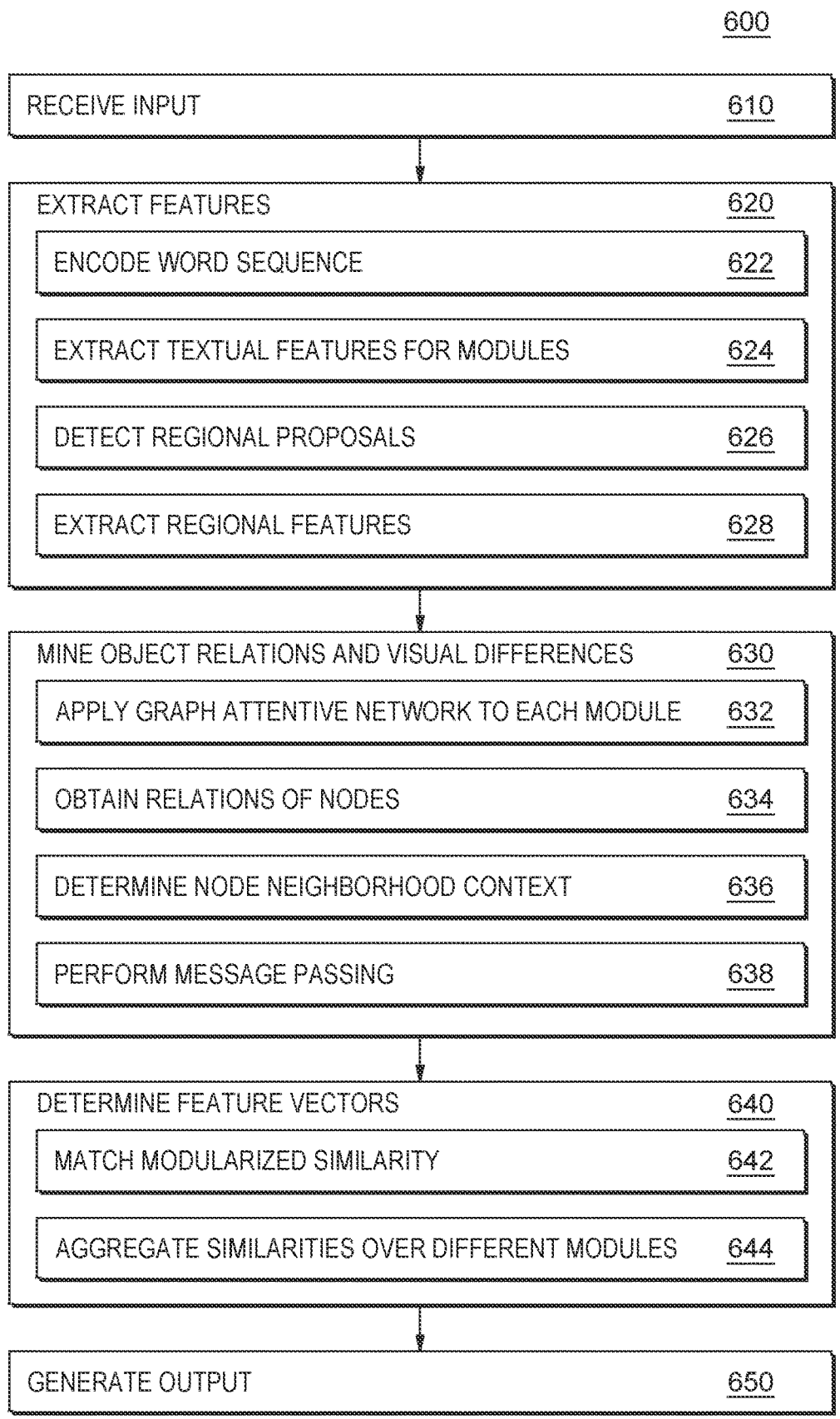
FIG. 6 depicts method for image grounding in accordance with some embodiments of the present disclosure.

FIG. 6 depicts method 600 precise image grounding in accordance with some embodiments of the present disclosure. The method 600 may be implemented using a system for precise image grounding (e.g., system 100 of FIG. 1). The method 600 includes receiving 610 an input, extracting 620 features, and mining 630 object relations and visual differences. The method 600 includes determining 640 feature vectors and generating 650 an output.

The method 600 includes extracting 620 features from the received input. Extracting 620 features may include encoding 622 a word sequence and extracting 624 textual features for modules. Extracting 620 features may include detecting 626 regional proposals and extracting 628 regional features.

The method 600 includes mining 630 object relations and visual differences. Mining 630 object relations and visual differences may include applying 632 a graph attentive network for each module. Mining 630 object relations and visual differences may include obtaining 634 the relations of the nodes; the graph attentive network may be used for obtaining 634 the relations of the nodes. Mining 630 object relations and visual differences may include determining 636 the node neighborhood context and performing 638 message passing.

The method 600 includes determining 640 feature vectors. Determining 640 feature vectors may include matching 642 modularized similarity; for example, modularized features may be mapped with fully connected layers and used to obtain modularized similarities via calculating dot products. Determining 640 feature vectors may include aggregating 644 the modularized similarities over the different modules to obtain a final similarity; for example, cross-modality matching may be used by linearly aggregating the modular similarities to obtain a final similarity.

The method 600 includes generating 650 an output. In some embodiments, the final similarity may be the output or part of the output; for example, the final similarity may be output to a user as a confidence score. In some embodiments, the final similarity may be used to identify, select, and/or generate the output; for example, the final similarity may identify a region in an image that is the answer to the query, and the system (e.g., system 100 of FIG. 1) may generate an output of an image with a highlight around the answer identified by the final similarity.

A computer program product in accordance with the present disclosure may include a computer readable storage medium having program instructions embodied therewith. The program instructions may be executable by a processor to cause the processor to perform a function. The function may include receiving an input, extracting features from the input, and mining object relations using the features. The function may include determining feature vectors using the object relations and generating, using the feature vectors, an output indicating a target region, wherein the target region corresponds to the input.

In some embodiments of the present disclosure, the input may include a textual statement including a plurality of textual modules.

In some embodiments of the present disclosure, the input may include a plurality of images. In some embodiments, the function may include selecting the target region as a component of one of the plurality of images.

In some embodiments of the present disclosure, the extracting may be based on at least one module. In some embodiments, the at least one module may include a subject module, a location module, and a relation module.

In some embodiments of the present disclosure, the function may include determining relations of visual nodes with neighboring visual nodes. In some embodiments, the determining may be conditional on textual features of the input. In some embodiments, the function may include aggregating context information of visual nodes from neighboring visual nodes. In some embodiments, the function may further include using the context information to determine the feature vectors.

In some embodiments of the present disclosure, the function may include encoding a textual sequence from the input. In some embodiments, the textual sequence may be encoded using a bidirectional long short-term memory neural network.

In some embodiments of the present disclosure, the function may include extracting textual features using an attention network. In some embodiments, the textual features may be extracted for a subject module, a location module, and a relation module. In some embodiments, the function may further include applying a text-guided graph attentive network to the textual features of the subject module, the location module, and the relation module.

In some embodiments of the present disclosure, the function may include detecting regional proposals. In some embodiments, the function may include using a mask region-based convolutional neural network.

In some embodiments of the present disclosure, the function may include extracting visual regional features. In some embodiments, the function may include using a mask region-based convolutional neural network to extract the visual regional features.

In some embodiments of the present disclosure, the function may include applying a text-guided graph attentive network to a module of the input.

In some embodiments of the present disclosure, an attention module may be used in the mining the object relations. In some embodiments, the attention module may mine the object relations conditional on at least one textual feature.

In some embodiments of the present disclosure, the function may include determining visual regional node aggregate context information based on neighborhood nodes.

In some embodiments of the present disclosure, the function may include obtaining comprehensive visual features for a plurality of regions in the input by performing message passing. In some embodiments, a text-guided graph neural network is used to perform message passing.

In some embodiments of the present disclosure, the function may include matching, bilinearly, modularized similarity between modularized textual features of the input and modularized visual features of the input.

In some embodiments of the present disclosure, the function may include aggregating, linearly, similarities over a plurality of modules to obtain a final similarity, wherein the final similarity is used in generating the output.

Figure 7:
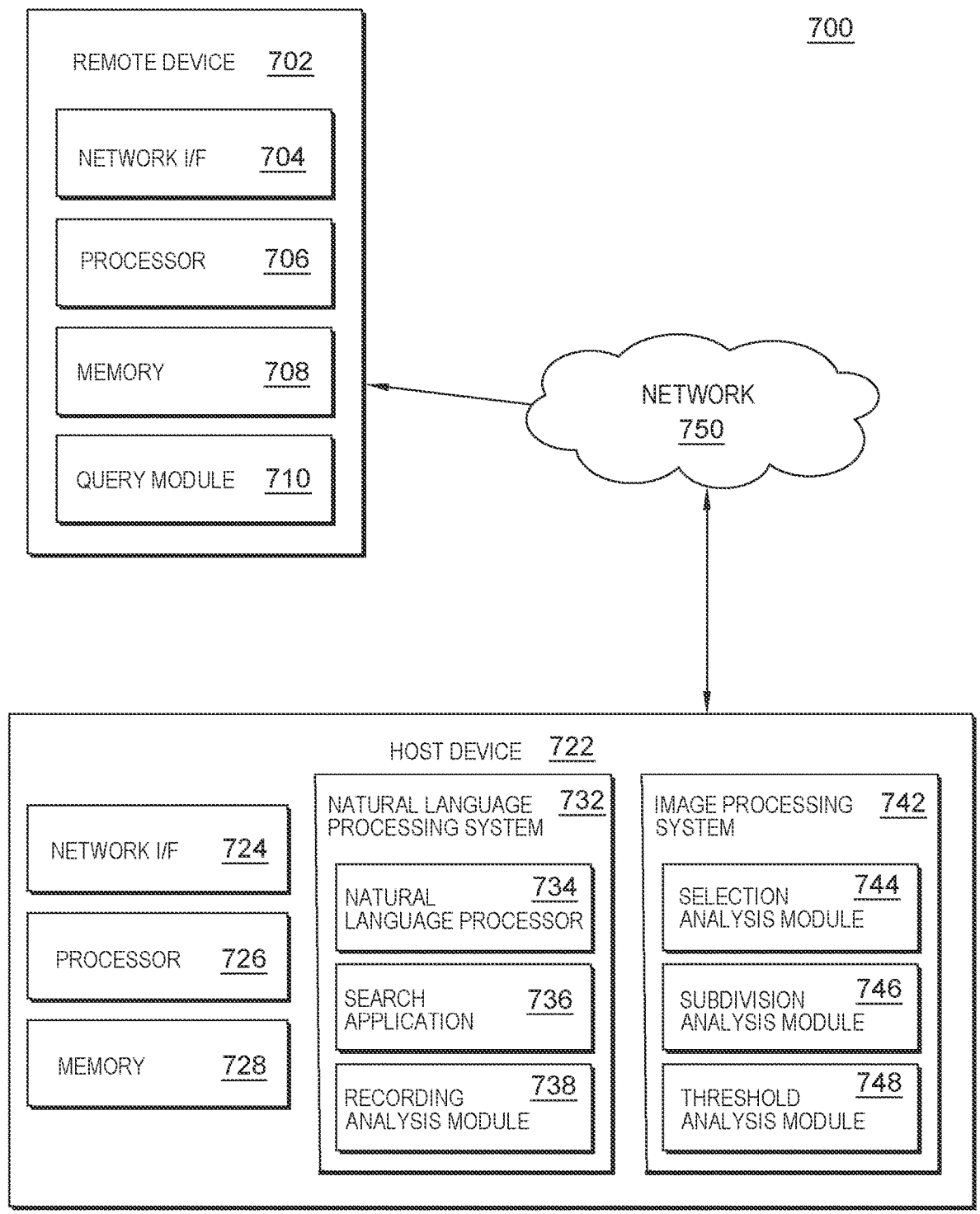
FIG. 7 illustrates a block diagram of an example computing environment in which illustrative embodiments of the present disclosure may be implemented.

Some embodiments of the present disclosure may utilize a natural language parsing and/or subparsing component. Thus, aspects of the disclosure may relate to natural language processing. Accordingly, an understanding of the embodiments of the present invention may be aided by describing embodiments of natural language processing systems and the environments in which these systems may operate. Turning now to FIG. 7, illustrated is a block diagram of an example computing environment 700 in which illustrative embodiments of the present disclosure may be implemented. In some embodiments, the computing environment 700 may include a remote device 702 and a host device 722.

Consistent with various embodiments of the present disclosure, the host device 722 and the remote device 702 may be computer systems. The remote device 702 and the host device 722 may include one or more processors 706 and 726 and one or more memories 708 and 728, respectively. The remote device 702 and the host device 722 may be configured to communicate with each other through an internal or external network interface 704 and 724. The network interfaces 704 and 724 may be modems or network interface cards. The remote device 702 and/or the host device 722 may be equipped with a display such as a monitor. Additionally, the remote device 702 and/or the host device 722 may include optional input devices (e.g., a keyboard, mouse, scanner, or other input device) and/or any commercially available or custom software (e.g., browser software, communications software, server software, natural language processing software, search engine and/or web crawling software, filter modules for filtering content based upon predefined parameters, etc.). In some embodiments, the remote device 702 and/or the host device 722 may be servers, desktops, laptops, or hand-held devices.

The remote device 702 and the host device 722 may be distant from each other and communicate over a network 750. In some embodiments, the host device 722 may be a central hub from which remote device 702 can establish a communication connection, such as in a client-server networking model. Alternatively, the host device 722 and remote device 702 may be configured in any other suitable networking relationship (e.g., in a peer-to-peer configuration or using any other network topology).

In some embodiments, the network 750 can be implemented using any number of any suitable communications media. For example, the network 750 may be a wide area network (WAN), a local area network (LAN), an Internet, or an intranet. In certain embodiments, the remote device 702 and the host device 722 may be local to each other and communicate via any appropriate local communication medium. For example, the remote device 702 and the host device 722 may communicate using a local area network (LAN), one or more hardwire connections, a wireless link or router, or an intranet. In some embodiments, the remote device 702 and the host device 722 may be communicatively coupled using a combination of one or more networks and/or one or more local connections. For example, the remote device 702 may be hardwired to the host device 722 (e.g., connected with an Ethernet cable) or the remote device 702 may communicate with the host device using the network 750 (e.g., over the Internet).

In some embodiments, the network 750 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 750.

In some embodiments, the remote device 702 may enable a user to input (or may input automatically with or without a user) a query (e.g., is any part of a recording artificial, etc.) to the host device 722 in order to identify subdivisions of a recording that include a particular subject. For example, the remote device 702 may include a query module 710 and a user interface (UI). The query module 710 may be in the form of a web browser or any other suitable software module, and the UI may be any type of interface (e.g., command line prompts, menu screens, graphical user interfaces). The UI may allow a user to interact with the remote device 702 to input, using the query module 710, a query to the host device 722, which may receive the query.

In some embodiments, the host device 722 may include a natural language processing system 732. The natural language processing system 732 may include a natural language processor 734, a search application 736, and a recording module 738. The natural language processor 734 may include numerous subcomponents, such as a tokenizer, a part-of-speech (POS) tagger, a semantic relationship identifier, and a syntactic relationship identifier. An example natural language processor is discussed in more detail in reference to FIG. 8.

The search application 736 may be implemented using a conventional or other search engine and may be distributed across multiple computer systems. The search application 736 may be configured to search one or more databases (e.g., repositories) or other computer systems for content that is related to a query submitted by the remote device 702. For example, the search application 736 may be configured to search dictionaries, papers, and/or archived reports to help identify a particular subject related to a query provided for a class. The recording analysis module 738 may be configured to analyze a recording to identify a particular subject (e.g., of the query). The recording analysis module 738 may include one or more modules or units, and may utilize the search application 736, to perform its functions (e.g., to identify a particular subject in a recording), as discussed in more detail in reference to FIG. 8.

In some embodiments, the host device 722 may include an image processing system 742. The image processing system 742 may be configured to analyze images associated with a recording to create an image analysis. The image processing system 742 may utilize one or more models, modules, or units to perform its functions (e.g., to analyze the images associated with the recording and generate an image analysis). For example, the image processing system 742 may include one or more image processing models that are configured to identify specific images related to a recording. The image processing models may include a section analysis module 744 to analyze single images associated with the recording and to identify the location of one or more features of the single images. As another example, the image processing system 742 may include a subdivision module 746 to group multiple images together identified to have a common feature of the one or more features. In some embodiments, image processing modules may be implemented as software modules. For example, the image processing system 742 may include a section analysis module and a subdivision analysis module. In some embodiments, a single software module may be configured to analyze the image(s) using image processing models.

In some embodiments, the image processing system 742 may include a threshold analysis module 748. The threshold analysis module 748 may be configured to compare the instances of a particular subject identified in a subdivision of sections of the recording against a threshold number of instances. The threshold analysis module 748 may then determine if the subdivision should be displayed to a user.

In some embodiments, the host device may have an optical character recognition (OCR) module. The OCR module may be configured to receive a recording sent from the remote device 702 and perform optical character recognition (or a related process) on the recording to convert it into machine-encoded text so that the natural language processing system 732 may perform NLP on the report. For example, a remote device 702 may transmit a video of a medical procedure to the host device 722. The OCR module may convert the video into machine-encoded text and then the converted video may be sent to the natural language processing system 732 for analysis. In some embodiments, the OCR module may be a subcomponent of the natural language processing system 732. In other embodiments, the OCR module may be a standalone module within the host device 722. In still other embodiments, the OCR module may be located on the remote device 702 and may perform OCR on the recording before the recording is sent to the host device 722.

While FIG. 7 illustrates a computing environment 700 with a single host device 722 and a remote device 702, suitable computing environments for implementing embodiments of this disclosure may include any number of remote devices and host devices. The various models, modules, systems, and components illustrated in FIG. 7 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS to generate an image analysis.

It is noted that FIG. 7 is intended to depict the representative major components of an exemplary computing environment 700. In some embodiments, however, individual components may have greater or lesser complexity than as represented in FIG. 7, components other than or in addition to those shown in FIG. 7 may be present, and the number, type, and configuration of such components may vary.

Figure 8:
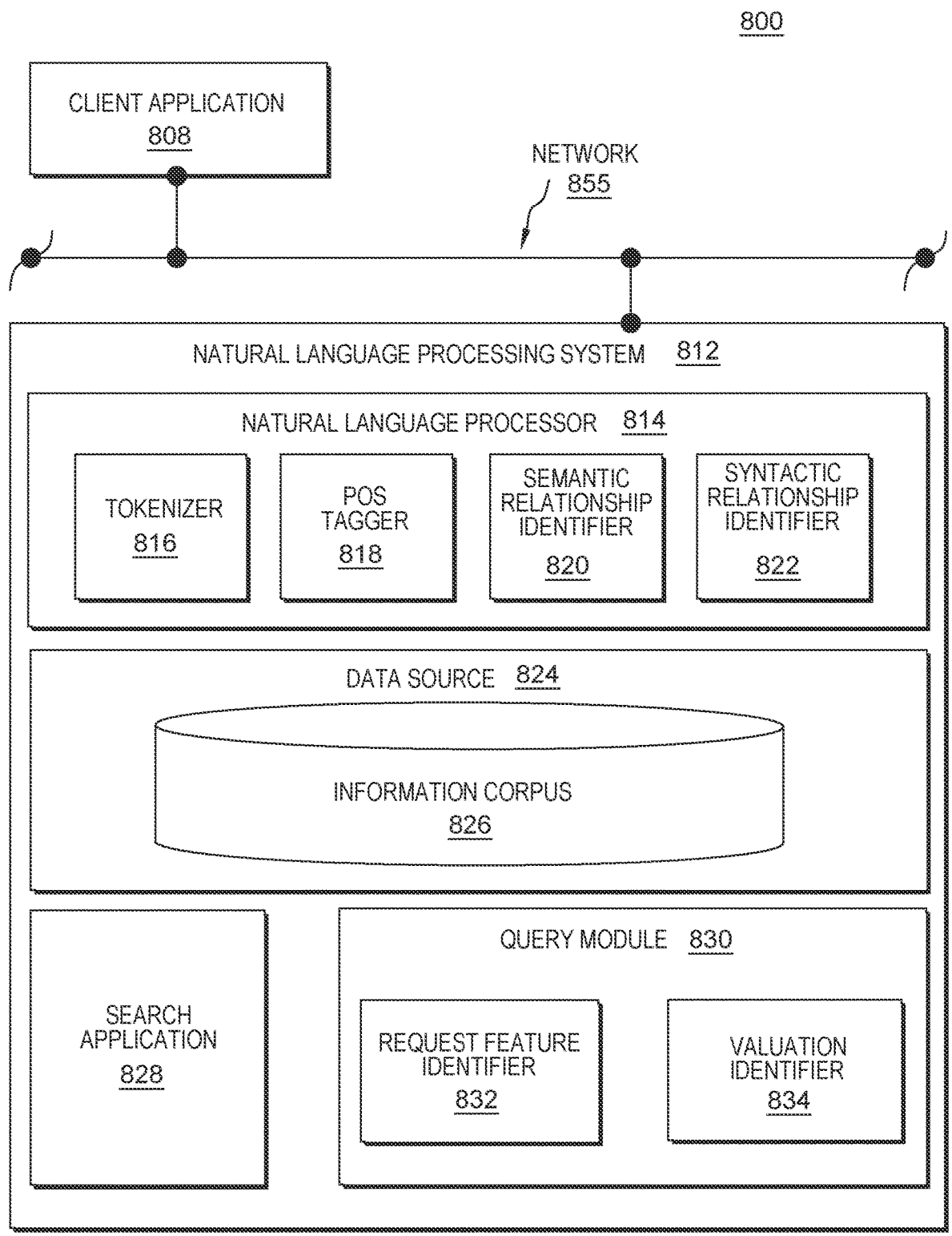
FIG. 8 depicts a block diagram of an example natural language processing system configured to analyze a recording to identify a particular subject of a query, in accordance with embodiments of the present disclosure.

Referring now to FIG. 8, shown is a block diagram of an exemplary system architecture 800 including a natural language processing system 812 configured to analyze data to identify objects of interest (e.g., possible anomalies, natural data, etc.), in accordance with embodiments of the present disclosure. In some embodiments, a remote device (such as remote device 702 of FIG. 7) may submit a text segment and/or a corpus to be analyzed to the natural language processing system 812 which may be housed on a host device (such as host device 722 of FIG. 7). Such a remote device may include a client application 808, which may itself involve one or more entities operable to generate or modify information associated with the recording and/or query that is then dispatched to a natural language processing system 812 via a network 855.

Consistent with various embodiments of the present disclosure, the natural language processing system 812 may respond to text segment and corpus submissions sent by a client application 808. Specifically, the natural language processing system 812 may analyze a received text segment and/or corpus (e.g., video, news article, etc.) to identify an object of interest. In some embodiments, the natural language processing system 812 may include a natural language processor 814, a data source 824, a search application 828, and a query module 830. The natural language processor 814 may be a computer module that analyzes the recording and the query. The natural language processor 814 may perform various methods and techniques for analyzing recordings and/or queries (e.g., syntactic analysis, semantic analysis, etc.). The natural language processor 814 may be configured to recognize and analyze any number of natural languages. In some embodiments, the natural language processor 814 may group one or more sections of a text into one or more subdivisions. Further, the natural language processor 814 may include various modules to perform analyses of text or other forms of data (e.g., recordings, etc.). These modules may include, but are not limited to, a tokenizer 816, a part-of-speech (POS) tagger 818 (e.g., which may tag each of the one or more sections of text in which the particular object of interest is identified), a semantic relationship identifier 820, and a syntactic relationship identifier 822.

In some embodiments, the tokenizer 816 may be a computer module that performs lexical analysis. The tokenizer 816 may convert a sequence of characters (e.g., images, sounds, etc.) into a sequence of tokens. A token may be a string of characters included in a recording and categorized as a meaningful symbol. Further, in some embodiments, the tokenizer 816 may identify word boundaries in a body of text and break any text within the body of text into their component text elements, such as words, multiword tokens, numbers, and punctuation marks. In some embodiments, the tokenizer 816 may receive a string of characters, identify the lexemes in the string, and categorize them into tokens.

Consistent with various embodiments, the POS tagger 818 may be a computer module that marks up a word in a recording to correspond to a particular part of speech. The POS tagger 818 may read a passage or other text in natural language and assign a part of speech to each word or other token. The POS tagger 818 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed body of texts and/or corpora (e.g., the content of one text segment may shed light on the meaning of one or more objects of interest in another text segment). Examples of parts of speech that may be assigned to words include, but are not limited to, nouns, verbs, adjectives, adverbs, and the like. Examples of other part of speech categories that POS tagger 818 may assign include, but are not limited to, comparative or superlative adverbs, wh-adverbs, conjunctions, determiners, negative particles, possessive markers, prepositions, wh-pronouns, and the like. In some embodiments, the POS tagger 818 may tag or otherwise annotate tokens of a recording with part of speech categories. In some embodiments, the POS tagger 818 may tag tokens or words of a recording to be parsed by the natural language processing system 812.

In some embodiments, the semantic relationship identifier 820 may be a computer module that may be configured to identify semantic relationships of recognized subjects (e.g., words, phrases, images, etc.) in a body of text/corpus. In some embodiments, the semantic relationship identifier 820 may determine functional dependencies between entities and other semantic relationships.

Consistent with various embodiments, the syntactic relationship identifier 822 may be a computer module that may be configured to identify syntactic relationships in a body of text/corpus composed of tokens. The syntactic relationship identifier 822 may determine the grammatical structure of sentences such as, for example, which groups of words are associated as phrases and which word is the subject or object of a verb. The syntactic relationship identifier 822 may conform to formal grammar.

In some embodiments, the natural language processor 814 may be a computer module that may group sections of a recording into subdivisions and generate corresponding data structures for one or more subdivisions of the recording. For example, in response to receiving a text segment at the natural language processing system 812, the natural language processor 814 may output subdivisions of the text segment as data structures. In some embodiments, a subdivision may be represented in the form of a graph structure. To generate the subdivision, the natural language processor 814 may trigger computer modules 816-822.

In some embodiments, the output of natural language processor 814 may be used by search application 828 to perform a search of a set of (i.e., one or more) corpora to retrieve one or more subdivisions including a particular subject associated with a query (e.g., in regard to an object of interest) and send the output to an image processing system and to a comparator. As used herein, a corpus may refer to one or more data sources, such as a data source 824 of FIG. 8. In some embodiments, the data source 824 may include video libraries, data warehouses, information corpora, data models, and/or document repositories. In some embodiments, the data source 824 may include an information corpus 826. The information corpus 826 may enable data storage and retrieval. In some embodiments, the information corpus 826 may be a subject repository that houses a standardized, consistent, clean, and integrated list of images and text. For example, an information corpus 826 may include teaching presentations that include step by step images and comments on how to perform a function. Data may be sourced from various operational systems. Data stored in an information corpus 826 may be structured in a way to specifically address reporting and analytic requirements. In some embodiments, an information corpus 826 may be a relational database.

In some embodiments, a query module 830 may be a computer module that identifies objects of interest within sections of a text, or other forms of data. In some embodiments, a query module 830 may include a request feature identifier 832 and a valuation identifier 834. When a query is received by the natural language processing system 812, the query module 830 may be configured to analyze text using natural language processing to identify an object of interest. The query module 830 may first identity one or more objects of interest in the text using the natural language processor 814 and related subcomponents 816-822. After identifying the one or more objects of interest, the request feature identifier 832 may identify one or more common objects of interest (e.g., anomalies, artificial content, natural data, etc.) present in sections of the text (e.g., the one or more text segments of the text). In some embodiments, the common objects of interest in the sections may be the same object of interest that is identified. Once a common object of interest is identified, the request feature identifier 832 may be configured to transmit the text segments that include the common object of interest to an image processing system (shown in FIG. 7) and/or to a comparator.

After identifying common objects of interest using the request feature identifier 832, the query module may group sections of text having common objects of interest. The valuation identifier 834 may then provide a value to each text segment indicating how close the object of interest in each text segment is related to one another (and thus indicates artificial and/or real data). In some embodiments, the particular subject may have one or more of the common objects of interest identified in the one or more sections of text. After identifying a particular object of interest relating to the query (e.g., identifying that one or more of the common objects of interest may be an anomaly), the valuation identifier 834 may be configured to transmit the criterion to an image processing system (shown in FIG. 7) and/or to a comparator (which may then determine the validity of the common and/or particular objects of interest).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
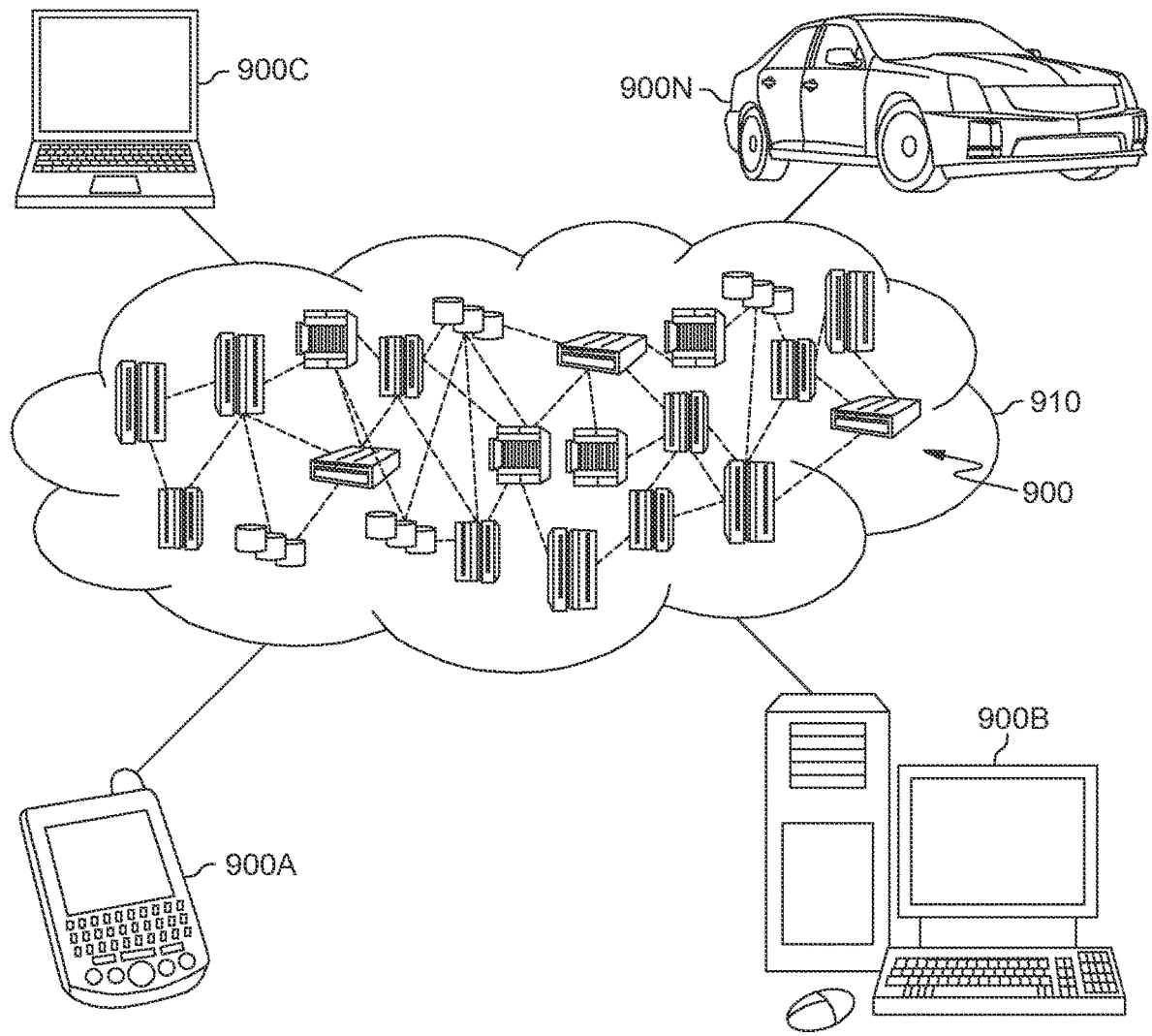
FIG. 9 illustrates a cloud computing environment in accordance with embodiments of the present disclosure.

FIG. 9 illustrates a cloud computing environment 910 in accordance with embodiments of the present disclosure. As shown, cloud computing environment 910 includes one or more cloud computing nodes 900 with which local computing devices used by cloud consumers such as, for example, personal digital assistant (PDA) or cellular telephone 900A, desktop computer 900B, laptop computer 900C, and/or automobile computer system 900N may communicate. Nodes 900 may communicate with one another. They may be grouped (not shown) physically or virtually, in one or more networks, such as private, community, public, or hybrid clouds as described hereinabove, or a combination thereof.

This allows cloud computing environment 910 to offer infrastructure, platforms, and/or software as services for which a cloud consumer does not need to maintain resources on a local computing device. It is understood that the types of computing devices 900A-N shown in FIG. 9 are intended to be illustrative only and that computing nodes 900 and cloud computing environment 910 can communicate with any type of computerized device over any type of network and/or network addressable connection (e.g., using a web browser).

Figure 10:
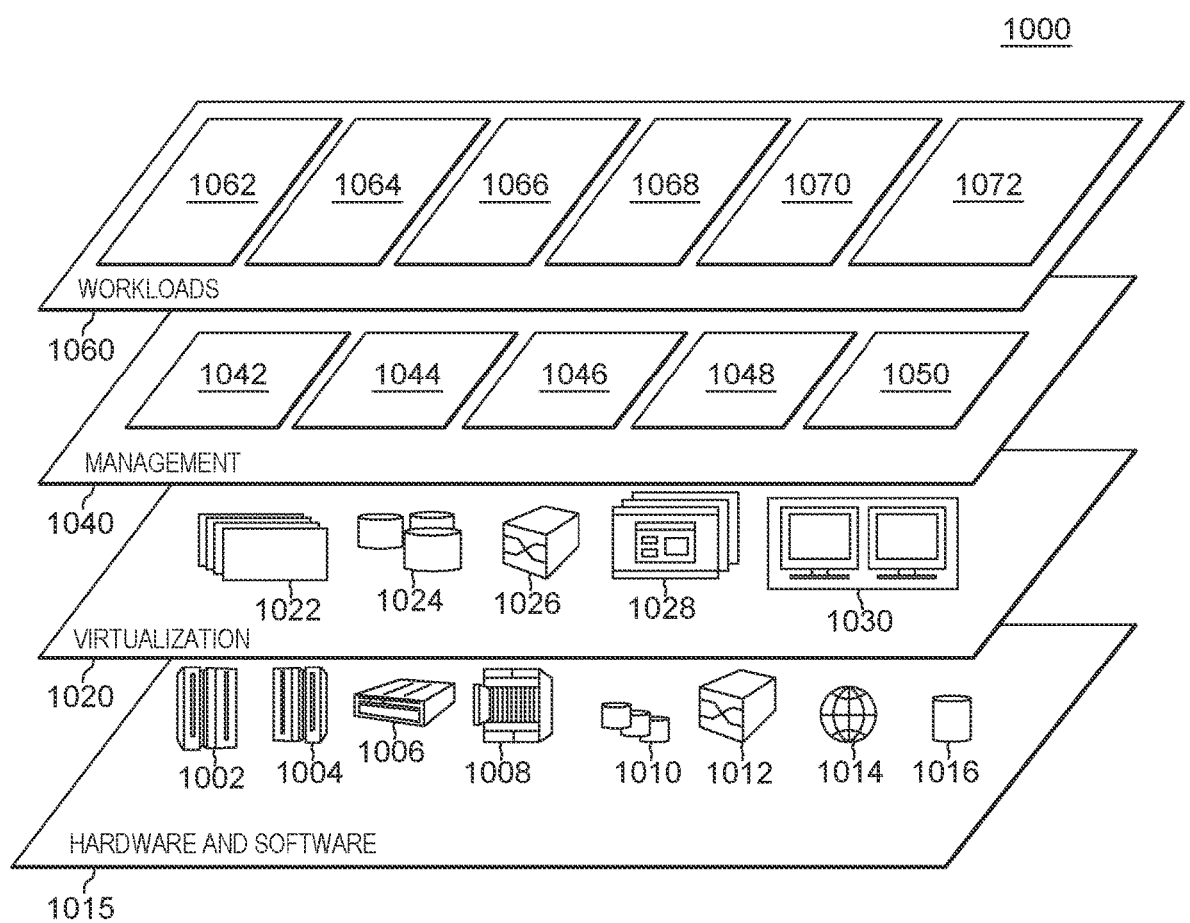
FIG. 10 depicts abstraction model layers in accordance with embodiments of the present disclosure.

FIG. 10 illustrates abstraction model layers 1000 provided by cloud computing environment 910 (FIG. 9) in accordance with embodiments of the present disclosure. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1015 includes hardware and software components. Examples of hardware components include: mainframes 1002; RISC (Reduced Instruction Set Computer) architecture-based servers 1004; servers 1006; blade servers 1008; storage devices 1011; and networks and networking components 1012. In some embodiments, software components include network application server software 1014 and database software 1016.

Virtualization layer 1020 provides an abstraction layer from which the following examples of virtual entities may be provided: virtual servers 1022; virtual storage 1024; virtual networks 1026, including virtual private networks; virtual applications and operating systems 1028; and virtual clients 1030.

In one example, management layer 1040 may provide the functions described below. Resource provisioning 1042 provides dynamic procurement of computing resources and other resources that are utilized to perform tasks within the cloud computing environment. Metering and pricing 1044 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 1046 provides access to the cloud computing environment for consumers and system administrators. Service level management 1048 provides cloud computing resource allocation and management such that required service levels are met. Service level agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment may be utilized. Examples of workloads and functions which may be provided from this layer include: mapping and navigation 1062; software development and lifecycle management 1064; virtual classroom education delivery 1066; data analytics processing 1068; transaction processing 1070; and precise image grounding with a modularized graph attentive neural network 1072.

Figure 11:
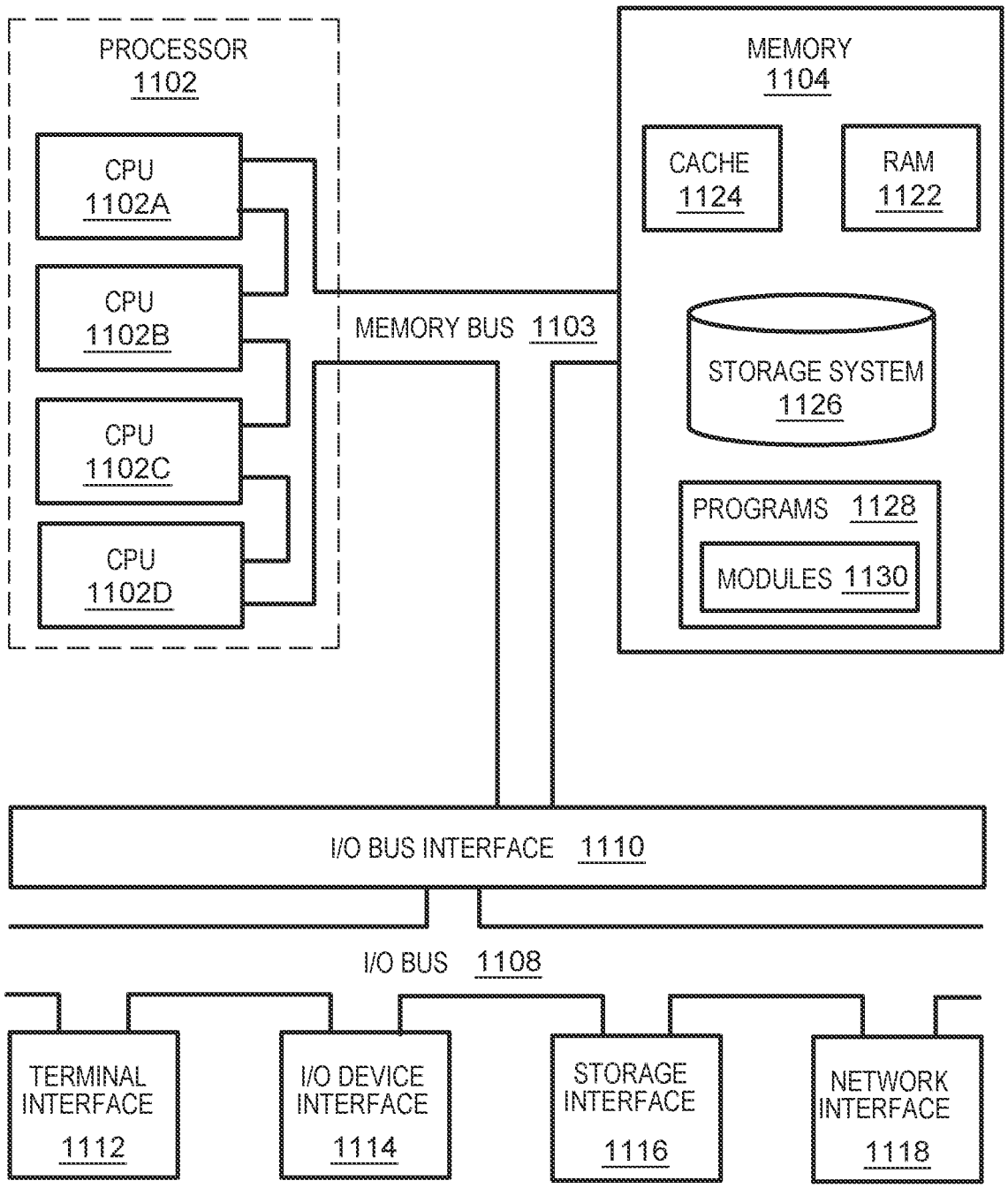
FIG. 11 illustrates a high-level block diagram of an example computer system that may be used in implementing one or more of the methods, tools, and modules, and any related functions, described herein, in accordance with embodiments of the present disclosure.

FIG. 11 illustrates a high-level block diagram of an example computer system 1101 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 1101 may comprise a processor 1102 with one or more central processing units (CPUs) 1102A, 1102B, 1102C, and 1102D, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable CPUs 1102A, 1102B, 1102C, and 1102D, herein generically referred to as the CPU 1102. In some embodiments, the computer system 1101 may contain multiple processors typical of a relatively large system; however, in other embodiments, the computer system 1101 may alternatively be a single CPU system. Each CPU 1102 may execute instructions stored in the memory subsystem 1104 and may include one or more levels of on-board cache.

System memory 1104 may include computer system readable media in the form of volatile memory, such as random access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

One or more programs/utilities 1128, each having at least one set of program modules 1130, may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 1128 and/or program modules 1130 generally perform the functions or methodologies of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units 1110 are shown, which separate the I/O bus 1108 from various communications paths running to the various I/O devices, in other embodiments some or all of the I/O devices may be connected directly to one or more system I/O buses 1108.

In some embodiments, the computer system 1101 may be a multi-user mainframe computer system, a single-user system, a server computer, or similar device that has little or no direct user interface but receives requests from other computer systems (clients). Further, in some embodiments, the computer system 1101 may be implemented as a desktop computer, portable computer, laptop or notebook computer, tablet computer, pocket computer, telephone, smartphone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
receiving an input;
extracting features from said input, wherein extracting features from said input comprises:
using an attention network to extract textual features for a plurality of specific modules, the plurality of specific modules including at least a subject module, a location module, and a relation module, wherein the attention network parses different components of the input for each specific module, including parsing a subject component for the subject module, a location component for the location module, and a relation component for the relation module;
mining object relations using said features;
determining feature vectors using said object relations; and
generating, using said feature vectors, an output indicating a target region, wherein said target region corresponds to said input.

2. The system of claim 1, wherein:
said input includes a textual statement with a plurality of textual modules.

3. The system of claim 1, said operations further comprising:
obtaining visual features for a plurality of regions in said input by performing message passing.

4. The system of claim 1, said operations further comprising:
applying a text-guided graph attentive neural network to a module of said input.

5. The system of claim 1, said operations further comprising:
determining visual regional node aggregate context information based on neighborhood nodes.

6. The system of claim 1, said operations further comprising:
matching, bilinearly, modularized similarity between modularized textual features of said input and modularized visual features of said input.

7. A computer-implemented method, said method comprising:
receiving an input;
extracting features from said input, wherein extracting features from said input comprises:
using an attention network to extract textual features for a plurality of specific modules, the plurality of specific modules including at least a subject module, a location module, and a relation module, wherein the attention network parses different components of the input for each specific module, including parsing a subject component for the subject module, a location component for the location module, and a relation component for the relation module;
mining object relations using said features;
determining feature vectors using said object relations; and
generating, using said feature vectors, an output indicating a target region, wherein said target region corresponds to said input.

8. The computer-implemented method of claim 7, wherein:
said input includes a textual statement with a plurality of textual modules.

9. The computer-implemented method of claim 8, further comprising:
obtaining visual features for a plurality of regions in said input by performing message passing.

10. The computer-implemented method of claim 7, further comprising:
applying a text-guided graph attentive neural network to a module of said input.

11. The computer-implemented method of claim 7, further comprising:
determining visual regional node aggregate context information based on neighborhood nodes.

12. The computer-implemented method of claim 7, further comprising:
matching, bilinearly, modularized similarity between modularized textual features of said input and modularized visual features of said input.

13. The computer-implemented method of claim 7, further comprising:
aggregating, linearly, similarities over a plurality of modules to obtain a final similarity, wherein said final similarity is used in generating said output.

14. A computer program product, said computer program product comprising a computer readable storage medium having program instructions embodied therewith, said program instructions executable by a processor to cause said processor to perform a function, said function comprising:
receiving an input;
extracting features from said input, wherein extracting features from said input comprises:
using an attention network to extract textual features for a plurality of specific modules, the plurality of specific modules including at least a subject module, a location module, and a relation module, wherein the attention network parses different components of the input for each specific module, including parsing a subject component for the subject module, a location component for the location module, and a relation component for the relation module;
mining object relations using said features;
determining feature vectors using said object relations; and
generating, using said feature vectors, an output indicating a target region, wherein said target region corresponds to said input.

15. The computer program product of claim 14, said function further comprising:
applying a text-guided graph attentive neural network to a module of said input.

16. The computer program product of claim 14, said function further comprising:
determining visual regional node aggregate context information based on neighborhood nodes.

17. The computer program product of claim 14, said function further comprising:
matching, bilinearly, modularized similarity between modularized textual features of said input and modularized visual features of said input.

* * * * *